(12) United States Patent
Ishizu et al.

(10) Patent No.: US 8,405,960 B2
(45) Date of Patent: Mar. 26, 2013

(54) DISPLAY APPARATUS

(75) Inventors: Takafumi Ishizu, Yokohama (JP); Nobuyuki Kaku, Oiso (JP); Go Horiuchi, Kamakura (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 280 days.

(21) Appl. No.: 12/915,771

(22) Filed: Oct. 29, 2010

(65) Prior Publication Data

US 2011/0141671 A1 Jun. 16, 2011

(30) Foreign Application Priority Data

Dec. 10, 2009 (JP) .................................. 2009-280481

(51) Int. Cl.
*G06F 1/16* (2006.01)
(52) U.S. Cl. ..................... 361/679.01; 348/843; 348/794
(58) Field of Classification Search .............. 361/679.01
See application file for complete search history.

(56) References Cited

U.S. PATENT DOCUMENTS

| | | | |
|---|---|---|---|
| 6,256,075 B1 * | 7/2001 | Yang ............................. 348/843 |
| 7,170,759 B2 * | 1/2007 | Soga .............................. 361/825 |
| 7,175,152 B2 * | 2/2007 | Dittmer .................... 248/221.11 |
| 7,259,958 B2 * | 8/2007 | Bang et al. ............... 361/679.27 |
| 7,334,765 B2 * | 2/2008 | Hwang ....................... 248/284.1 |
| 7,561,423 B2 * | 7/2009 | Turusaki et al. ......... 361/679.21 |
| 7,667,782 B2 | 2/2010 | Iwai et al. |
| 8,025,265 B2 * | 9/2011 | Lee ............................. 248/291.1 |
| 8,085,259 B2 * | 12/2011 | Kubota et al. .................. 345/211 |
| 8,094,243 B2 * | 1/2012 | Yokawa ......................... 348/794 |
| 2004/0232298 A1 * | 11/2004 | Bremmon et al. ........ 248/281.11 |
| 2005/0264985 A1 * | 12/2005 | Kim et al. ....................... 361/681 |
| 2007/0097617 A1 * | 5/2007 | Searby et al. .................. 361/686 |
| 2008/0117580 A1 * | 5/2008 | Dittmer et al. ................. 361/681 |

FOREIGN PATENT DOCUMENTS

| | | |
|---|---|---|
| JP | 2000-333100 A | 11/2000 |
| JP | 2001-331123 A | 11/2001 |
| JP | 3108915 U | 4/2005 |
| JP | 2005-134591 A | 5/2005 |
| JP | 3109372 U | 5/2005 |
| JP | 2005-338788 A | 12/2005 |
| JP | 2008-141606 | 6/2008 |

OTHER PUBLICATIONS

Japanese Office Action issued in Japanese Application No. 2009-280481 mailed Dec. 25, 2012.

* cited by examiner

*Primary Examiner* — Lisa Lea Edmonds
(74) *Attorney, Agent, or Firm* — McDermott Will & Emery LLP

(57) ABSTRACT

Disclosed is a wall-mountable display apparatus that is simple in structure and excellent in withstand load. In an inner central portion of a rear cover of the display apparatus, a boss bulged towards a display panel is formed integrally with the cover, with a distal end of the boss being fixedly coupled to a base chassis in such a manner that the boss end is opposed to part of the base chassis. The boss is formed in a substantially central position of a mounting region defined by four mounting holes to which wall-mounting metallic fixtures are to be mounted. Alternatively, the boss is formed in a substantially central position of the mounting region in a horizontal direction.

5 Claims, 6 Drawing Sheets

DISPLAY APPARATUS

CLAIM OF PRIORITY

The present application claims priority from Japanese patent application serial No. JP 2009-280481, filed on Dec. 10, 2009, the content of which is hereby incorporated by reference into this application.

BACKGROUND OF THE INVENTION (1) Field of the Invention

The present invention relates to a wall-mountable, flat-screen type of display apparatus.

(2) Description of the Related Art

Flat-screen televisions (TVs) in recent years employ a thin-shaped display element such as a liquid-crystal panel or plasma display panel (PDP). In terms of installation form, TVs that can be used in a wall-mounted condition as well as in the onfloor-standing condition supported by a TV stand are also placed in practical use. To use a TV in a wall-mounted condition, TVs are further required for reduction in both thickness and weight. Additionally, the mechanism for the wall-mounting section is required to be strong enough to support the TV and to release heat from the rear panel thereof.

Japanese Patent Application Publication JP-2008-141606-A discloses a related technique. In the conventional technique of JP-2008-141606-A, in order to reduce a wall-mountable display apparatus in weight, a wall-mounting metallic fixture is deleted from the enclosure of a display unit. Instead, the apparatus includes an intermediary metallic fixture screwed onto the display unit from the outside with a rear cabinet applied to the unit, the intermediary fixture locking the unit with respect to the wall side.

Utility Model Registration No. 3109372 discloses a configuration in which, in order to release heat from a wall-mounted liquid-crystal TV appropriately, after a turning member for a stand member has been stored into a rear portion of an enclosure, the turning member has its distal end abutted on a wall to form a required clearance between the wall and the rear surface of the enclosure by inclining at a required angle to the wall side during wall mounting.

SUMMARY OF THE INVENTION

JP-2008-141606-A employs a structure in which, after the deletion of the bridge-shaped metallic fixture from the enclosure interior, the intermediary metallic fixture is secured from the outside of the rear cabinet to reduce the display main unit in thickness and in weight. In this case, the intermediary metallic fixture is screwed onto the display unit via the cabinet. Screw fixing that ranges from the intermediary metallic fixture to the display unit has restrictions on fixing positions, in that since the electric components are arranged on or in the rear panel of the display unit, such screw fixing must be executed at a position excluding the place where the electronic components are arranged. Alternatively, using the bridge-shaped metallic fixture that ranges from an upper side of the display unit to a lower side thereof leads to upsizing the fixture and resulting in increased costs.

In Utility Model Registration No. 3109372, the liquid-crystal display unit has its side faces and reverse face that are surrounded by a resin frame, and the resin frame has a plurality of heat release holes and two engaging holes formed in a rear portion thereof. To mount the liquid-crystal TV on a wall, it is necessary to engage each of the two engaging holes with an engaging hook of the mounting plate which is also mounted on the wall. In this structure, the load imposed by the liquid-crystal TV needs to be supported with the two engaging holes of the resin frame. Since the resin frame is short of strength in comparison with metallic materials, this structure is small in withstand load, so TVs applicable to such a structure are limited to compact ones. If a metallic reinforcing fixture that connects to a chassis of a metallic material is provided centrally inside the resin frame, the withstand load improves but the provision of the extra metallic fixture increases costs.

An object of the present invention is to provide a display apparatus that is simple in structure and excellent in withstand load, the apparatus being adapted to be used in a wall-mounted condition without upsizing a wall-mounting metal fixture or adding to the inside of an enclosure a metallic reinforcing fixture that connects to a chassis.

An aspect of the present invention is a display apparatus including a display panel for displaying images, a base chassis with electronic components mounted thereon for driving the display panel, and a rear cover for protecting the electronic components, and designed so as to be wall-mountable by mounting a wall-mounting metallic fixture outside the rear cover; wherein, the rear cover includes a boss provided in an inner central portion of the rear cover and bulged towards the display panel, the boss being formed integrally with the rear cover, with a distal end of the boss being fixedly coupled to the base chassis in such a manner that the boss end is opposed to part of the chassis.

The boss section here is formed in a substantially central position of a mounting region defined on the rear cover in order to mount the wall-mounting metallic fixture. Alternatively, the boss section is formed in a substantially central position of the mounting region in a horizontal direction.

According to the present invention, a display apparatus is provided that is simple in structure, minimized in costs, and excellent in withstand load.

BRIEF DESCRIPTION OF THE DRAWINGS

These and other features, objects and advantages of the present invention will become more apparent from the following description when taken in conjunction with the accompanying drawings, wherein.

DETAILED DESCRIPTION OF THE EMBODIMENT

Figure 1:
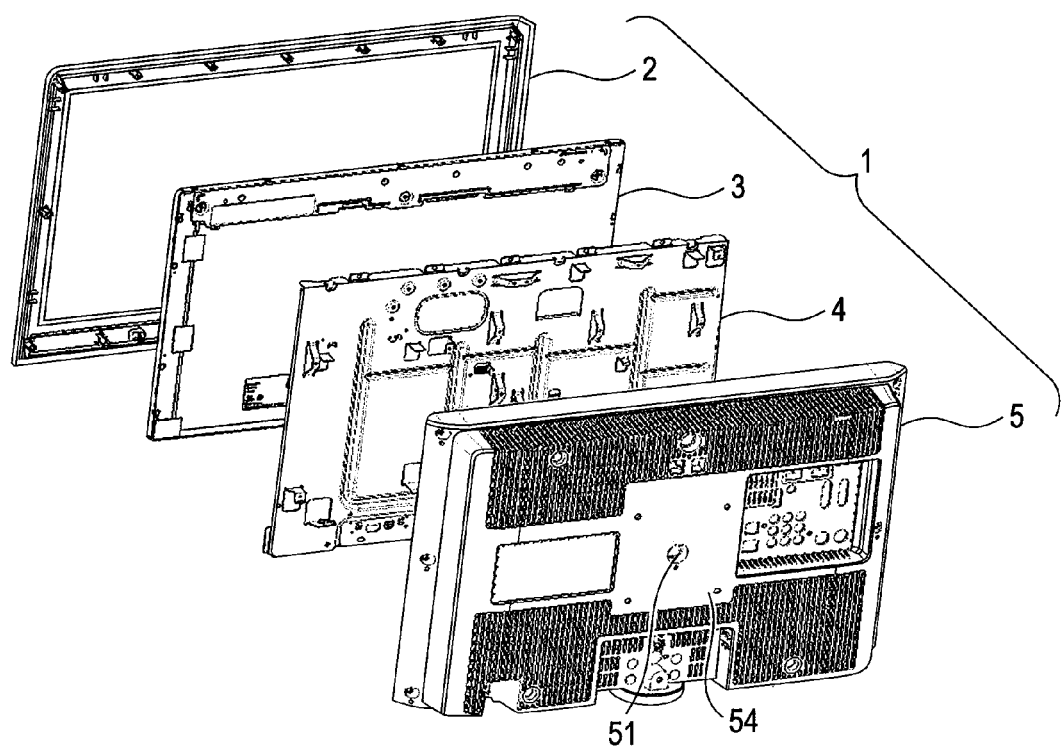
FIG. 1 is an exploded perspective view illustrating an embodiment of a display apparatus according to the present invention.

Hereunder, embodiments of the present invention are described using the accompanying drawings. FIG. 1 is an exploded perspective view illustrating an embodiment of a display apparatus according to the present invention. The display apparatus (hereinafter, also called the set) 1 is equivalent to, for example, a flat-screen liquid-crystal display apparatus or plasma display apparatus, and can be mounted selectively in either a stand-supported onfloor-standing condition or a wall-mounted condition. The set 1 includes, in its body, a bezel 2, a display panel 3, a base chassis 4, and a rear cover 5, in that order from the front thereof. The bezel 2 retains the display panel 3, the display panel 3 including a flat-screen liquid-crystal display element or plasma display element to display images. The base chassis 4 has a main circuit board, a power supply circuit board, a hard-disk drive (HDD) recording device, loudspeakers, operating buttons, and other electronic components mounted on the chassis 4 to drive the display panel 3. The rear cover 5 is constructed to protect the electronic components on the base chassis 4 and so that wall-mounting metallic fixtures can be mounted on an outer surface of the chassis 4. That is to say, the rear cover 5 has mounting holes 54 for the wall-mounting fixtures, and a boss 51 for reinforcing the rear cover 5 during wall mounting. Four mounting holes 54 are arranged at required intervals on substantially central positions of the rear cover 5, and the boss 51 is provided in a mounting region surrounded by the four mounting holes 54.

Figure 2A:
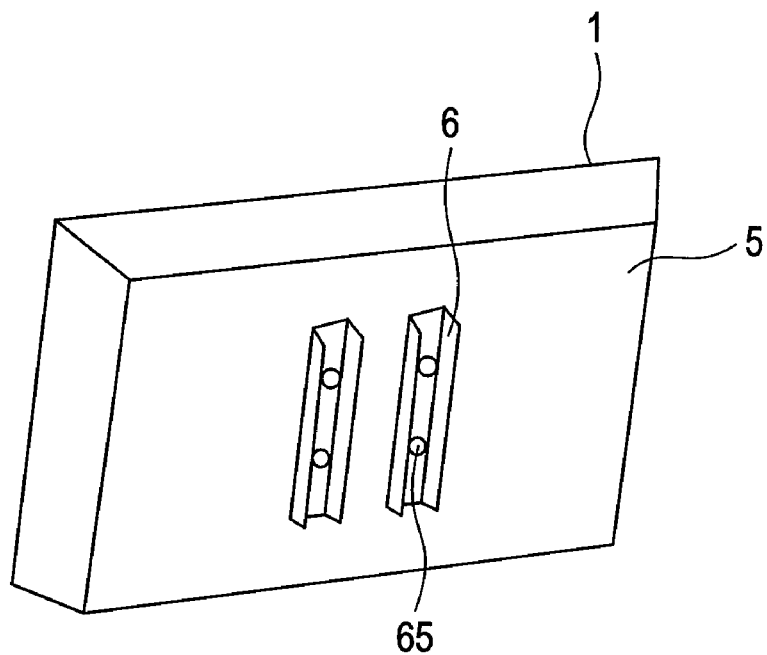
FIG. 2A is an illustrative view of a wall-mounting method for the display apparatus, the view representing the apparatus existing before being mounted on a wall.
Figure 2B:
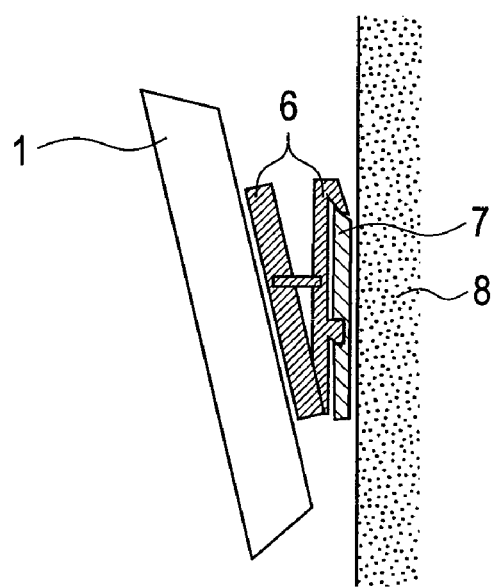
FIG. 2B is another illustrative view of the wall-mounting method for the display apparatus, the view representing the apparatus existing after being mounted on the wall.

FIGS. 2A and 2B show a method of mounting the display apparatus on a wall, FIG. 2A being a rear view of the set existing before wall mounting, and FIG. 2B being a side view of the set existing when mounted on the wall. First, the wall-mounting fixtures 6 are mounted on the rear cover 5 of the set body 1, as in FIG. 2A. During mounting, the two wall-mounting fixtures 6 are arranged in a vertical direction, then positioned using the mounting holes 54 provided on the surface of the rear cover 5, and fixed using four mounting screws 65.

Next as in FIG. 2B, the set body 1 on which the wall-mounting fixtures 6 have been mounted is mounted on the wall 8. For this purpose, a wall fixture 7 is mounted on the wall 8. In order to make the display screen of the set body 1 inclinable, the wall-mounting fixtures 6 are each constructed to have a leg section that can be opened to assume a V-shape in side view. The wall-mounting fixtures 6 are fixed to the wall 8 by hanging the fixtures 6 on the wall fixture 7. FIG. 2B illustrates the wall-mounting fixtures 6 of a type inclining the display screen of the set forward. Alternatively, however, the fixtures 6 can be of either a type that conversely inclines the display screen of the set backward, or a type that enables both forward inclining and backward inclining.

Figure 3:
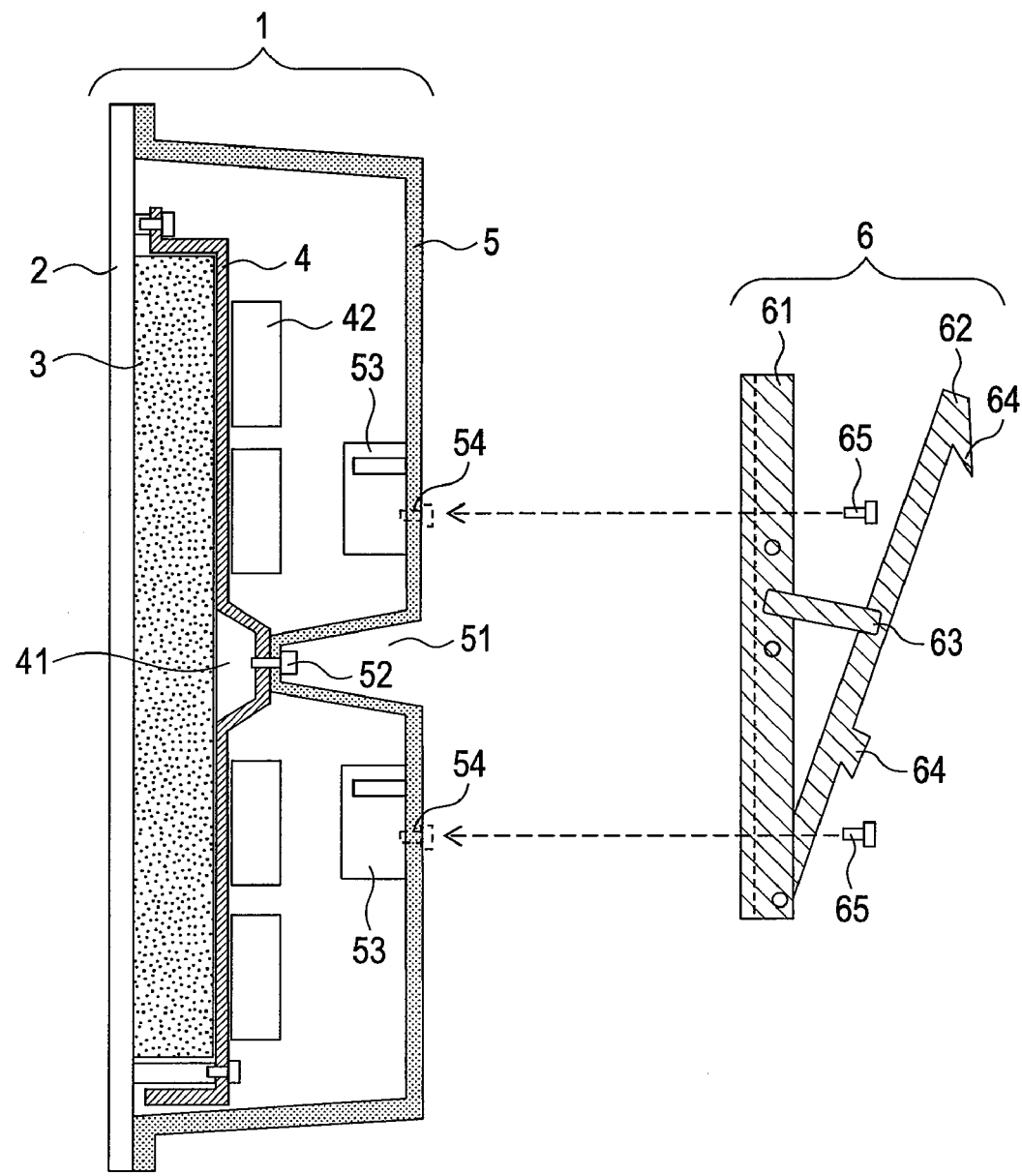
FIG. 3 is a sectional view illustrating an internal structure of the display apparatus.

FIG. 3 is a sectional view illustrating an internal structure of the display apparatus. More specifically, FIG. 3 is a lateral sectional view taken through the boss 51 provided on the rear cover 5. On the inner side of the rear cover 5, the substantially cylindrical boss 51 bulged towards the display panel 3 is formed by integral molding of a resin molding material, the cover material. Another protrusion 41 by integral molding with the chassis material is formed on the base chassis 4 at a position opposed to the boss 51. The distal end of the boss 51 is fixed to the protrusion 41 via a boss-fixing screw 52. The electronic component 42 mounted on the base chassis 4 is disposed so as to avoid the protrusion 41. This structure with the rear cover 5 and the base chassis 4 fixedly coupled to each other using the boss 51 significantly improves strength of the rear cover 5, especially, that of the central section thereof on which the wall-mounting fixtures 6 are to be mounted.

Mounting of the wall-mounting fixtures 6 is described below. The wall-mounting fixtures 6 are fixed via the mounting holes 54 of the rear cover 5 by means of the mounting screws 65. In order to improve strength of a peripheral region of the mounting holes 54 during fixing, cover-mounting sections 53 each including partly a metallic piece are provided on the inner side of the rear cover 5 so as to be connected to the mounting holes 54. Each wall-mounting fixture 6 includes a fixture A61 and a fixture B62. The fixtures A61 and B62 are constructed to be openable to take a V-shape, and an opening/closing angle of the fixtures A61 and B62 being adjusted using an angle adjust fitting 63. After the fixture A61 has been fixed to the cover-mounting sections 53 of the rear cover 5, the fixture A62 is engaged with the wall fixture 7 (see FIG. 2B). The fixture B62 has two hooks 64 for engaging with the wall fixture 7. In this way, the wall-mounting fixture 6 is mounted central section on a rear panel of the rear cover 5, so it suffices for the wall-mounting fixture 6 to be small.

Figure 4:
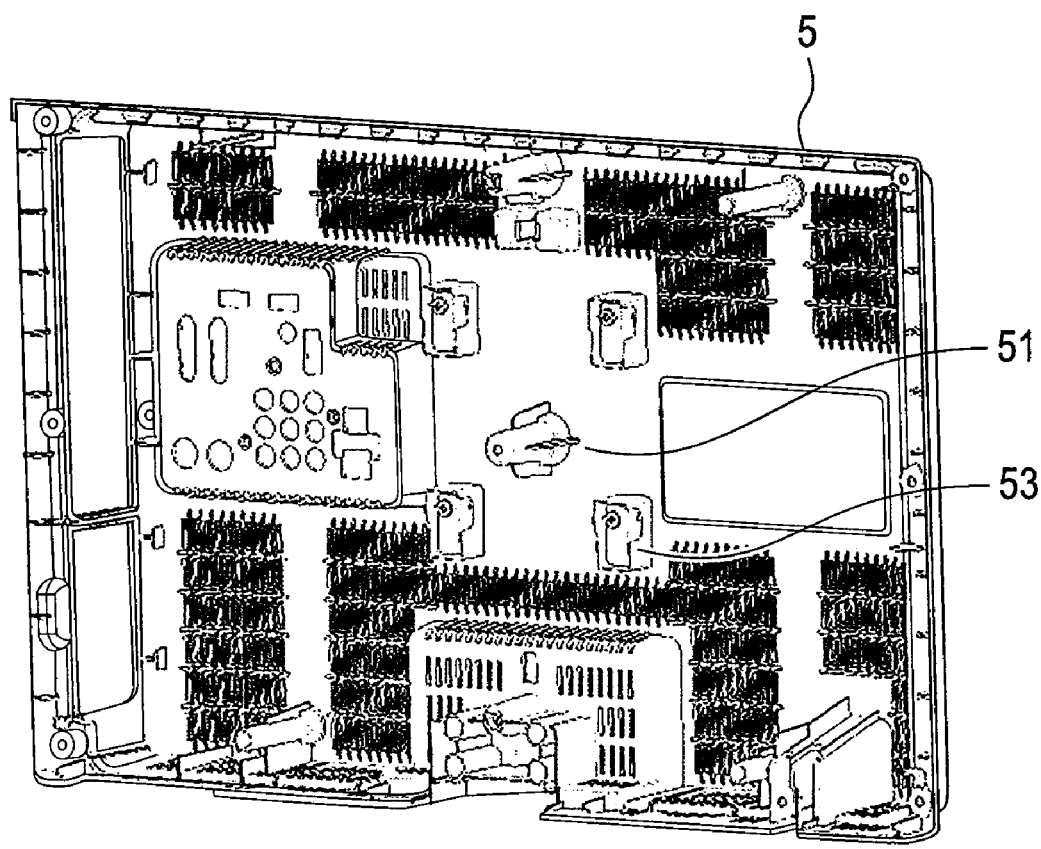
FIG. 4 is a perspective view illustrating a structure on the inner side of a rear cover.

FIG. 4 is a perspective view illustrating a structure on the inner side of the rear cover 5. The boss 51 and the cover-mounting sections 53 are present on the inner side of the rear cover 5. The boss 51, formed by molding a tapered cylindrical protrusion from the molding material of the rear cover 5, reinforces a lateral face of the boss in a crisscross blade form. The boss 51 has appropriate height to abut the protrusion 41 formed on the base chassis 4, with an abutting surface having a hole for the fixing screw 52. The four cover-mounting sections 53, each formed by molding a molding material into protruding form, each have a metallic piece added to the surface thereof to improve the mounting strength when the wall-mounting fixture 6 is mounted thereto. In this manner, the molding material of the rear cover 5 can be used intact without adding a reinforcing fixture to couple the rear cover 5 and the base chassis 4 to each other. This characteristic simplifies the structure, suppressing an increase in wall-mounting reinforcement cost.

Figure 5:
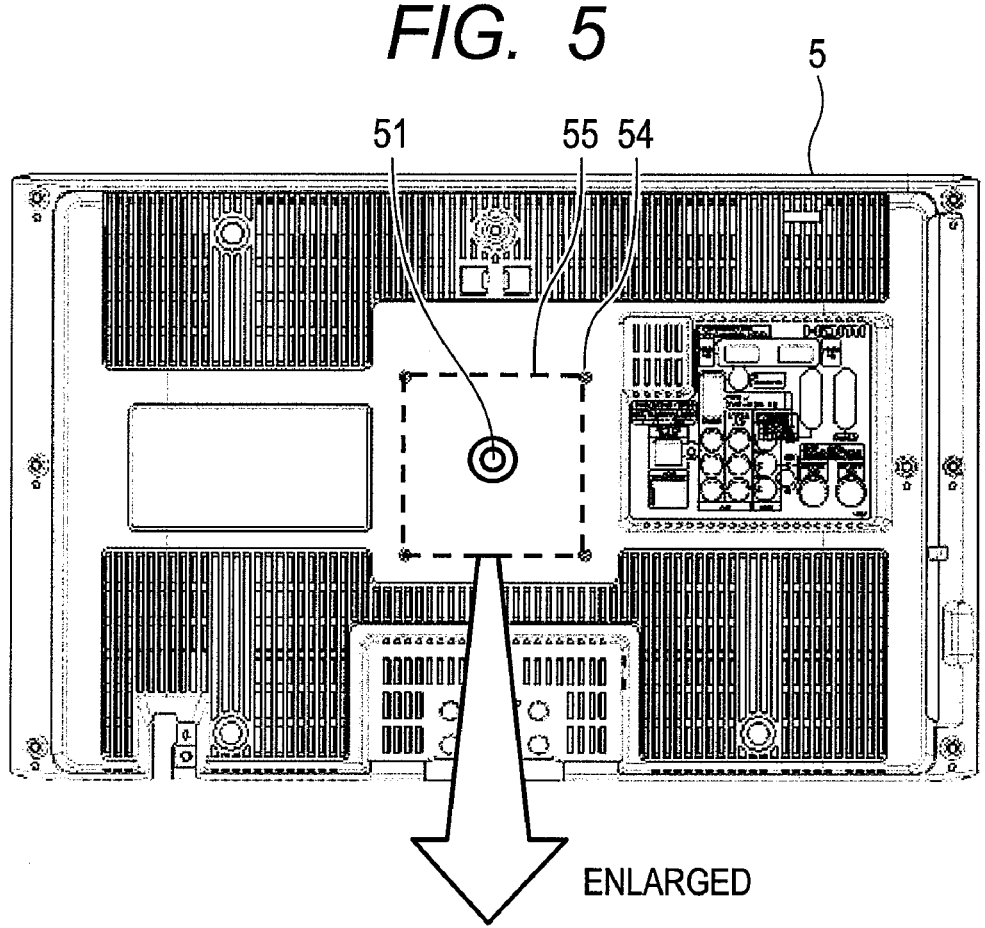
FIG. 5 is an illustrative view of a pre-positioning layout study region relating to formation of a boss.
Figure 5:
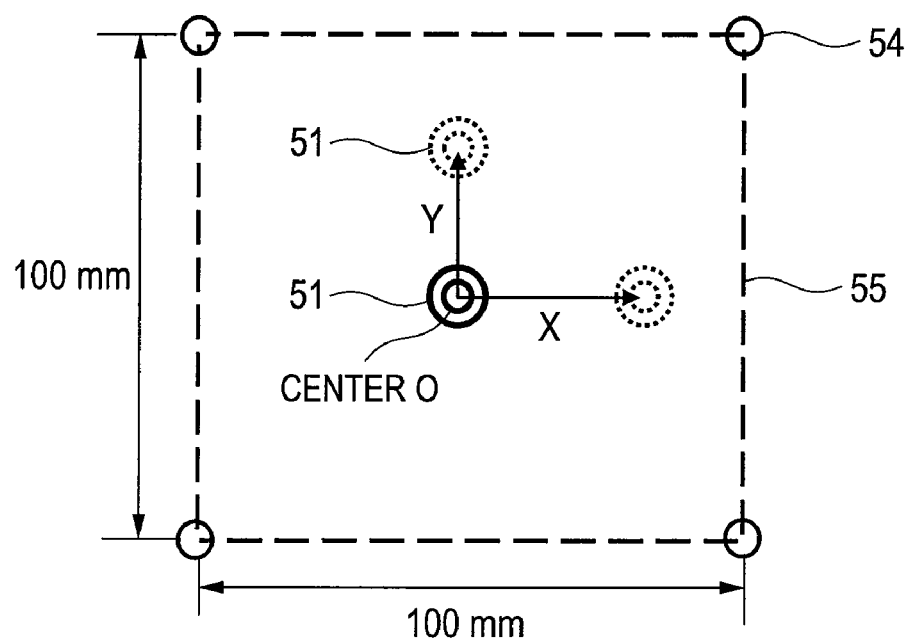

Study results on optimizing the forming position of the boss 51 are described below. FIG. 5 is an illustrative view of a pre-positioning layout study region relating to the formation of the boss, with the rear cover 5 being illustrated in external view and a mounting region being illustrated in enlarged form. First, the mounting region 55 of a substantially square shape with a size of 100 mm on a side is defined in the substantially central section of the rear cover 5, and the four mounting holes 54 are formed at corners of the square. Next, prior to forming the boss 51 in the mounting region 55, shifting the boss 51 in a direction of X (horizontal) or Y (vertical) from a center O of the mounting region 55 is considered as case studies.

During the optimizing studies, a maximum amount of displacement of the set that is likely to occur when the position of the boss 51 (hereinafter, referred to simply as the boss position) is shifted in the X- or Y-direction following the fixing of the set to the wall-mounting fixtures 6 via the mounting holes 54, and a maximum stress at the positions of the mounting holes 54 are calculated by structural analysis simulation. The simulation assumes that a load of the set is 15 kg and that the wall-mounting fixtures 6 are inclined through 20 degrees in both forward and backward directions.

Figure 6:
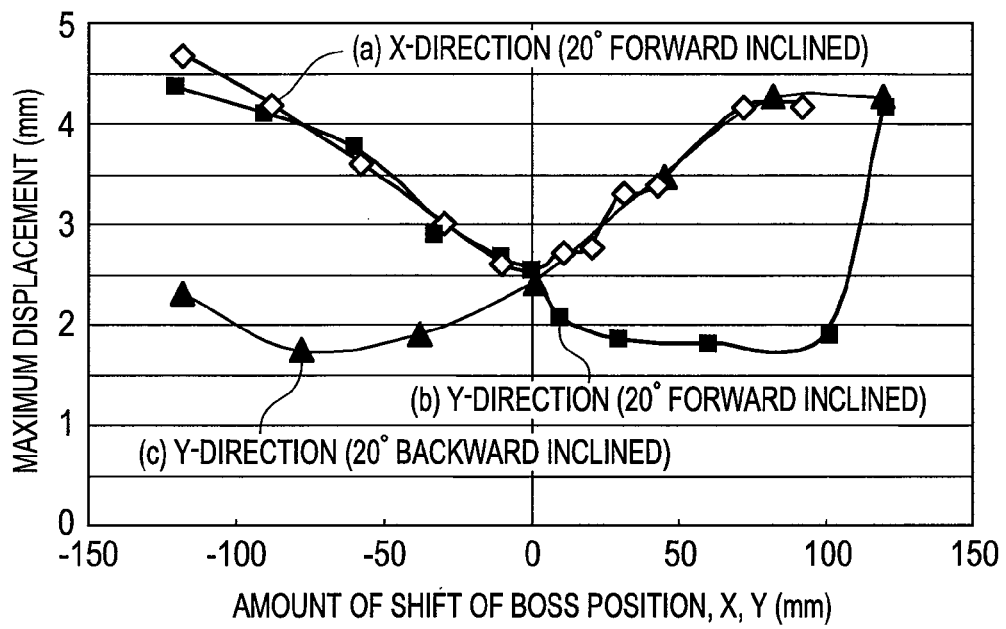
FIG. 6 is a diagram that represents a relationship between a position of the boss and the amount of displacement of the set (the display apparatus)

FIG. 6 is a diagram that represents a relationship between the position of the boss and the amount of displacement of the set. Symbol (a) denotes a characteristic applying to the case in which the boss position is shifted in the X-direction at a 20-degree forward inclination angle of the set. In this case, the amount of displacement becomes a minimum when the boss takes up a central position of X=0 mm. This is considered to be due to the fact that at the central position of X=0 mm, a supporting position by the boss 51 and the cover-mounting sections 53 becomes symmetrical with respect to the set in the horizontal direction and deformation of the set also becomes symmetrical in the horizontal direction. Symbol (b) denotes a characteristic applying to the case in which the boss position is shifted in the Y-direction at the 20-degree forward inclination angle of the set. In this case, the amount of displacement becomes a minimum when the boss occupies an upper position of Y=0 to 100 mm from the center. Symbol (c) denotes a characteristic applying to the case in which the boss position is shifted in the Y-direction at a 20-degree backward inclination angle of the set. In this case, the amount of displacement becomes a minimum when the boss occupies a lower position of Y=−100 to 0 mm from the center. These results mean that when the set inclines, the deformation of the set loses vertical symmetry and the optimum position also shifts. In consideration of both forward and backward directions as the inclining directions of the set, the central position of Y=0 mm at which the relationship graphically represented in FIG. 6 is satisfied is the appropriate boss position.

Figure 7:
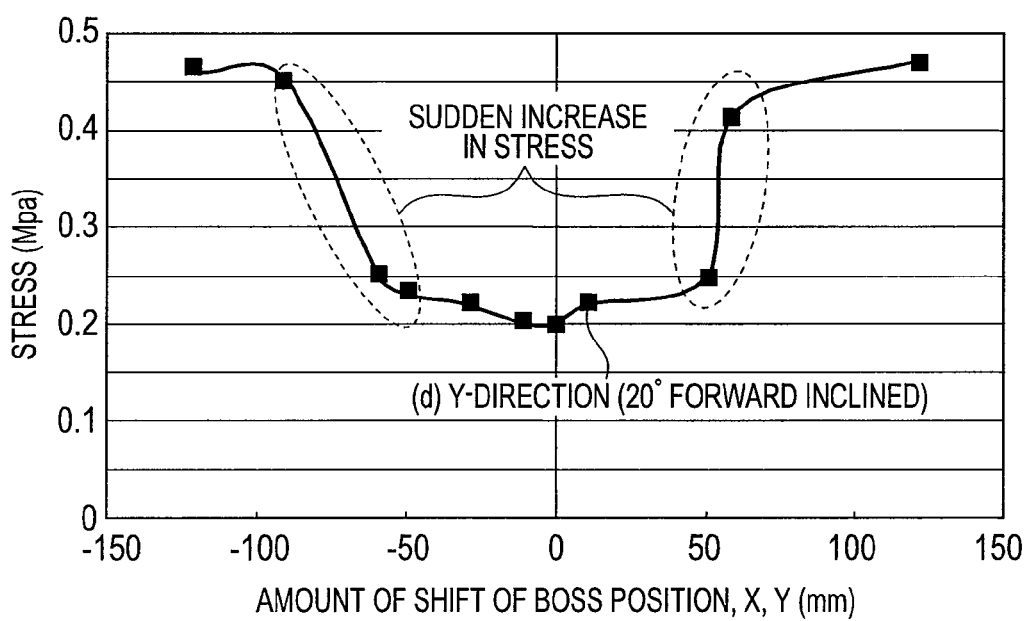
FIG. 7 is a diagram that represents a relationship between the position of the boss and a stress.

FIG. 7 is a diagram that represents a relationship between the boss position and a stress. Symbol (d) denotes a further characteristic applying to the case in which the boss position is shifted in the Y-direction at the 20-degree forward inclination angle of the set. In this case, the stress becomes a minimum when the boss position stays within a range of 50 mm in both upper and lower directions from the center (i.e., Y=−50 to 50 mm), and if this range is overstepped, the stress suddenly increases. This range is equivalent to the mounting region 55 surrounded by the mounting holes 54, so no problem arises while the boss is positioned inside the mounting region 55. Although not illustrated, substantially the same results can also be obtained by shifting the boss position in the Y-direction at the backward inclination angle of 20 degrees. Significant dependence between the boss position and the stress is not observed when the boss position is shifted in the X-direction at the forward inclination angle of 20 degrees.

The results represented in FIGS. 6 and 7 indicate in both X- and Y-directions, the optimum position of the boss lies in vicinity of either the central position of either the mounting region surrounded by the mounting holes 54, or the central position of the set (screen) 1. If importance is attached to the analytical results relating to the stress, shifting in the Y-direction does not pose a problem, provided that the boss position stays within the mounting region surrounded by the mounting holes 54. If the boss 51 is provided in a position that satisfies this condition, a display apparatus that is further excellent in withstand load can be realized.

In the above embodiment, the structure with one boss and four mounting holes (cover-mounting sections) on the surface of the rear cover has been employed. In other embodiments, however, the structure may include a plurality of bosses and more than four mounting holes. For example, arranging two bosses to be shifted from the central position in a vertical direction offers advantages for mounting the set in the forward or backward inclined condition. Adding a larger number of bosses and mounting holes will lead to load distribution at various supporting sections, enabling the upsizing of the display apparatus.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A display apparatus comprising:
   a display panel that displays images;
   a base chassis with electronic components mounted thereon to drive the display panel; and
   a rear cover that protects the electronic components;
   the apparatus being constructed so as to be mounted on a wall by mounting wall-mounting metallic fixtures on an outer surface of the rear cover, wherein:
   the rear cover includes a boss provided in an inner central portion of the rear cover and bulged towards the display panel, the boss being formed integrally with the rear cover, with the distal end of the boss being fixedly coupled to the base chassis in such a manner that the boss end is opposed to part of the chassis.

2. The display apparatus according to claim 1, wherein:
   on the base chassis, a protrusion is formed integrally with the chassis, at a position opposed to the boss formed on the rear cover; and
   the boss is fixedly coupled to the protrusion.

3. The display apparatus according to claim 1, wherein:
   the rear cover includes a substantially square mounting region defined for mounting the wall-mounting fixtures, and a plurality of mounting holes provided at corners of the mounting region for mounting the wall-mounting fixtures; and
   a plurality of cover-mounting sections, each including partly a metallic piece, are provided on the inner side of the rear cover so as to be connected to the mounting holes.

4. The display apparatus according to claim 3, wherein:
   the boss is formed in a substantially central position of the mounting region defined on the rear cover.

5. The display apparatus according to claim 3, wherein:
   the boss is formed in a substantially central position of the mounting region defined on the rear cover in a horizontal direction.

\* \* \* \* \*